US006714118B1

(12) United States Patent
Frolov et al.

(10) Patent No.: US 6,714,118 B1

(45) Date of Patent: Mar. 30, 2004

(54) MODULAR ELECTRONIC DOOR SECURITY SYSTEM

(75) Inventors: George Frolov, Farmington, CT (US); John E. Walsh, III, Wallingford, CT (US)

(73) Assignee: Harrow Products, Inc., Woodcliff Lake, NJ (US)

( * ) Notice: Subject to any disclaimer, the term of this patent is extended or adjusted under 35 U.S.C. 154(b) by 0 days.

(21) Appl. No.: 09/566,520

(22) Filed: May 8, 2000

(51) Int. Cl.[7] .......................... G05B 23/00; G06F 7/00; G08B 29/100; H04B 1/00

(52) U.S. Cl. ...................... 340/5.7; 340/5.52; 340/542; 340/5.53; 70/279.1; 70/284

(58) Field of Search ................................ 340/5.7, 5.52, 340/542, 5.53; 70/472, 149, 422, 189, 279.1, 284, 319

(56) References Cited

U.S. PATENT DOCUMENTS

| | | | | | |
|---|---|---|---|---|---|
| 4,534,194 | A | * | 8/1985 | Aydin | 70/278 |
| 4,783,882 | A | | 11/1988 | Frolov | |
| 4,843,851 | A | | 7/1989 | Frolov | |
| 4,904,005 | A | | 2/1990 | Frolov | |
| 4,967,305 | A | * | 10/1990 | Murrer et al. | 361/172 |
| 5,473,236 | A | | 12/1995 | Frolov | |
| 5,608,298 | A | | 3/1997 | Frolov et al. | |
| 5,640,863 | A | | 6/1997 | Frolov | |
| 5,735,559 | A | | 4/1998 | Frolov | |
| 5,823,582 | A | | 10/1998 | Frolov et al. | |
| 5,923,264 | A | | 7/1999 | Lavelle et al. | |
| 5,988,708 | A | | 11/1999 | Frolov et al. | |
| 6,045,169 | A | | 4/2000 | Frolov | |
| 6,049,287 | A | * | 4/2000 | Yulkowski | 340/693.12 |
| 6,067,826 | A | * | 5/2000 | Holloway et al. | 70/278.3 |
| 6,145,353 | A | | 11/2000 | Doucet | |
| 6,286,347 | B1 | | 9/2001 | Frolov | |
| 6,297,725 | B1 | * | 10/2001 | Tischendorf et al. | 340/5.64 |
| 6,354,121 | B1 | | 3/2002 | Frolov | |
| 6,487,884 | B1 | * | 12/2002 | Constantinou | 70/277 |

* cited by examiner

*Primary Examiner*—Michael Horabik
*Assistant Examiner*—Vernal Brown
(74) *Attorney, Agent, or Firm*—Michael Best & Friedrich LLP

(57) ABSTRACT

A modular electronic door security system includes an input device, a control module and an electro-mechanical lockset mounted to a door configured to facilitate electrical interconnections interiorly of the door. The input device and/or control module may be mounted in a user defined location on the surface of the door. An optional override mechanism allows access to secured areas in the event of system failure or emergency.

20 Claims, 16 Drawing Sheets

MODULAR ELECTRONIC DOOR SECURITY SYSTEM

BACKGROUND OF THE INVENTION

This invention relates generally to handle operated doors incorporating an electronic lock system which may include other security measures such as cylindrical locks or mortise deadbolts. More particularly, the present invention relates generally to a modular electronic door security system in which the access control features of the system may be placed anywhere on the outside face of the door.

For buildings which have multiple interior secured areas, such as apartment houses, dormitories, hotels, etc., it is common for the door to incorporate an electronic lock system such as that disclosed in U.S. Pat. No. 5,473,236, which is assigned to the assignee of the present invention. The door essentially separates a secured area, such as a room or office, from an unsecured area, such as a hallway or foyer. The electronic lock system typically incorporates a terminal or electronic reader on the unsecured side or outside face of the door and a control module generally fixed to the secured side or inside face of the door. The control module stores a set of valid inputs, compares received inputs to stored inputs and produces a release signal used to unlock the door upon reception of a valid input. The inputs are typically numeric codes which can be encoded on magnetic cards, electronic keys containing ROM chips or simply keyed into a keypad. A micro-motor or solenoid is typically used to unlock the latch assembly and allow entry.

In known arrangements, the electronic reader is mounted in the immediate vicinity of the door handle. Often, the trim covering the lockset incorporates the electronic reader above the door handle. While this configuration is appropriate for the vast majority of uses, it may cause inconvenience for those individuals confined to a wheelchair or similar device. A seated person may not be able to conveniently activate the electronic reader and operate an adjacent handle at the same time.

Architects and other designers may wish to place the terminal or electronic reader well away from the door handle for aesthetic or other design purposes. Some interior doors may not accommodate an electronic lock system which requires the control module and input device to be mounted immediately adjacent to the door handle.

The location of the control and input devices may also effect the durability of the electronic lock system. The opening and closing of a door generates forces which may be harmful to components mounted to the door. Doors frequently slam or experience sudden shocks while in the process of opening or closing, e.g., someone or something hitting the open door. Components mounted at the latch edge of a door are subject to the greatest of these forces.

Accordingly, there is a need in the art for a modular electronic door security system which may be custom configured to suit a given application.

SUMMARY OF THE INVENTION

Briefly stated, the invention in a preferred form is a modular electronic door security system which allows the input device and/or control module to be mounted anywhere on the face of the door. The modular electronic door security system has particular applicability in connection with doors in facilities where handicapped accessibility is a priority.

The modular electronic door security system affords a level of flexibility which allows the system to be configured for a particular application. The modular system comprises an input device placed on the face of the door, a control module and an electro-mechanical lock assembly. The input device, control module and electro-mechanical lock assembly are in communication with one another. This communication may be accomplished via by conductors which are internal to the door. Communication may also be maintained by low power radio frequency (RF) or devices which produce an optical communications link. The necessary transmission and reception components of such wireless systems may be incorporated into each component of the system. The system may be battery powered for a stand alone capability or may be connected to an external power source through the hinge edge of the door.

The input device may incorporate a card reader, key pad, contact activatable dataport or other electronic security reader. The control module may be a separate unit or may be incorporated into the input device. The control module processes inputs received by the input device and generates a release signal to the electro-mechanical lock assembly upon reception of a valid input. The modular design of the door security system allows the control module and/or electronic reader to be mounted anywhere on the surface of the door.

The electro-mechanical lock assembly is mounted between the door handles and adjacent to the latch edge of the door. The electro-mechanical lock assembly incorporates a lockset, lever handles on the interior and exterior sides of the door and an electronic clutch or coupling device. The lockset has an actuator for operating the latch. The clutch includes a pin which is carried by the actuator. The lever handles operate a notched hub which is coaxial with the latch actuator. The clutch mechanism moves the pin from a non-engaged position where the hub and actuator move independently to an engaged position where the pin enters the hub notch, mechanically coupling the hub and actuator. The engaged position corresponds to unlocking the door because it allows lever movement to operate the latch and open the door.

A key operated override may be employed to override the security system and unlock the door.

An object of the invention is to provide a new and improved modular electronic door security system which is aesthetically pleasing and provides additional convenience to the handicapped user.

Another object of the invention is to provide a new and improved modular electronic door security system which gives architects and designers a wide range of flexibility in configuring installation of security system components.

A further object of the invention is to provide a new and improved modular electronic door security system which facilitates electrical interconnections that are internal to the door.

A yet further object of the invention is to provide a new and improve modular electronic door security system in which the modular components communicate using wireless technology.

A yet further object of the invention is to provide a new and improved modular electronic door security system which optionally includes a novel key override feature.

Other objects and advantages of the invention will become apparent from the drawings and the specification.

DETAILED DESCRIPTION OF THE PREFERRED EMBODIMENT

Figure 1B:
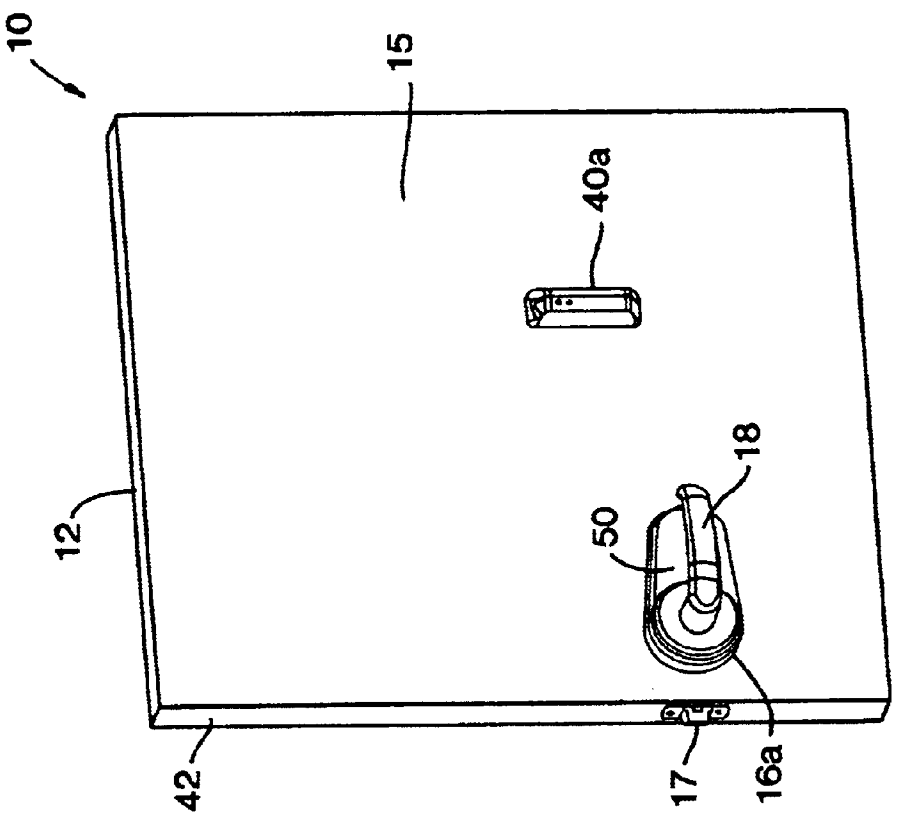
FIG. 1B is a partial perspective view of the unsecured side of the door of FIG. 1A.

With reference to the drawings, wherein like numerals represent like parts throughout the figures, a modular electronic door security system in accordance with the present invention, which may be installed in numerous configurations and employ a variety of components for a given application is generally designated by the numeral 10. The modular electronic door security system 10 is used in combination with a door 12. The door 12 separates an unsecured area from a secured area and has an inside face 14, generally facing the secured area and an outside face 15, generally facing the unsecured area.

Figure 1A:
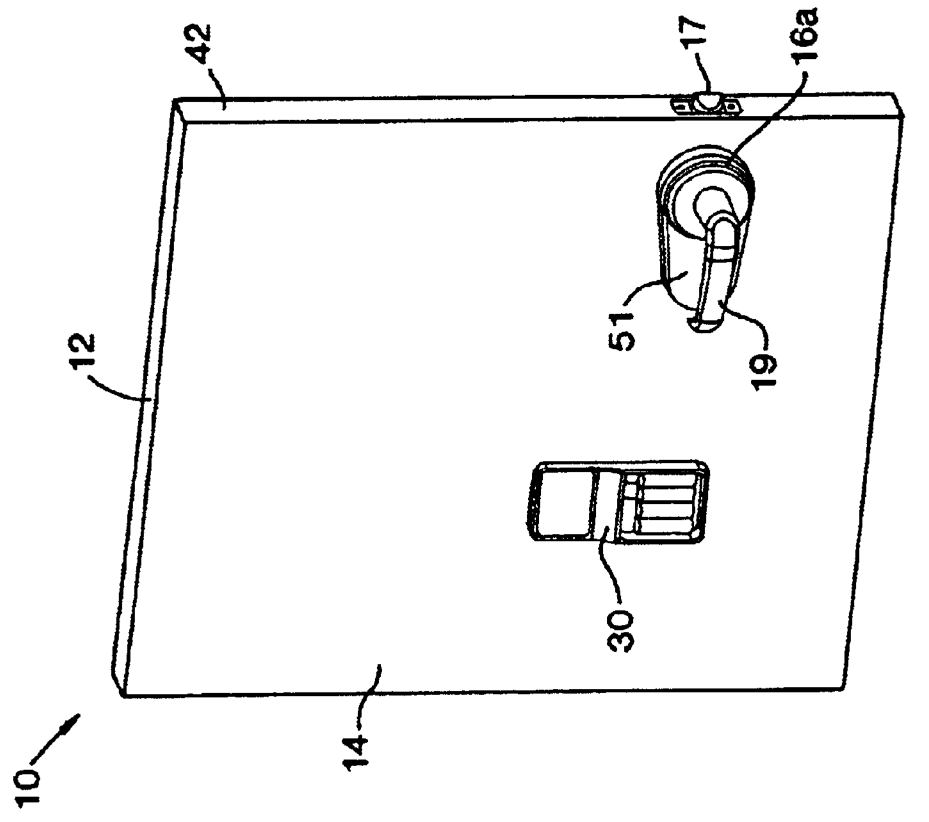
FIG. 1A is a partial perspective view of the secured side of a door incorporating a modular electronic door security system in accordance with the present invention.

The modular electronic door security system 10 comprises an input device 18, a control module 30, and an electro mechanical lockset 16 affixed to a door 12. The door 12 may be solid or hollow and may be made of steel, wood, or other door construction material. FIGS. 1A and 1B illustrate one possible installed configuration for the modular electronic door security system 10. An outer escutcheon assembly 50 is mounted to the outside face 15 of the door 12. An inner escutcheon assembly 51 is mounted to the inside face 14 of the door 12. A lockset **16*a* having a cylindrical latch 17, mechanically links the inner escutcheon assembly 51 and the outer escutcheon assembly 50. The latch 17 projects from the latch edge 42 of the door 12 and is operable by a handle 18 at the exterior side and a handle 19 at the secured side. The handles 18 and 19** may assume various forms including levers as illustrated, knobs, and other well known operator hardware.

Figures 2A, 2B, 2C:
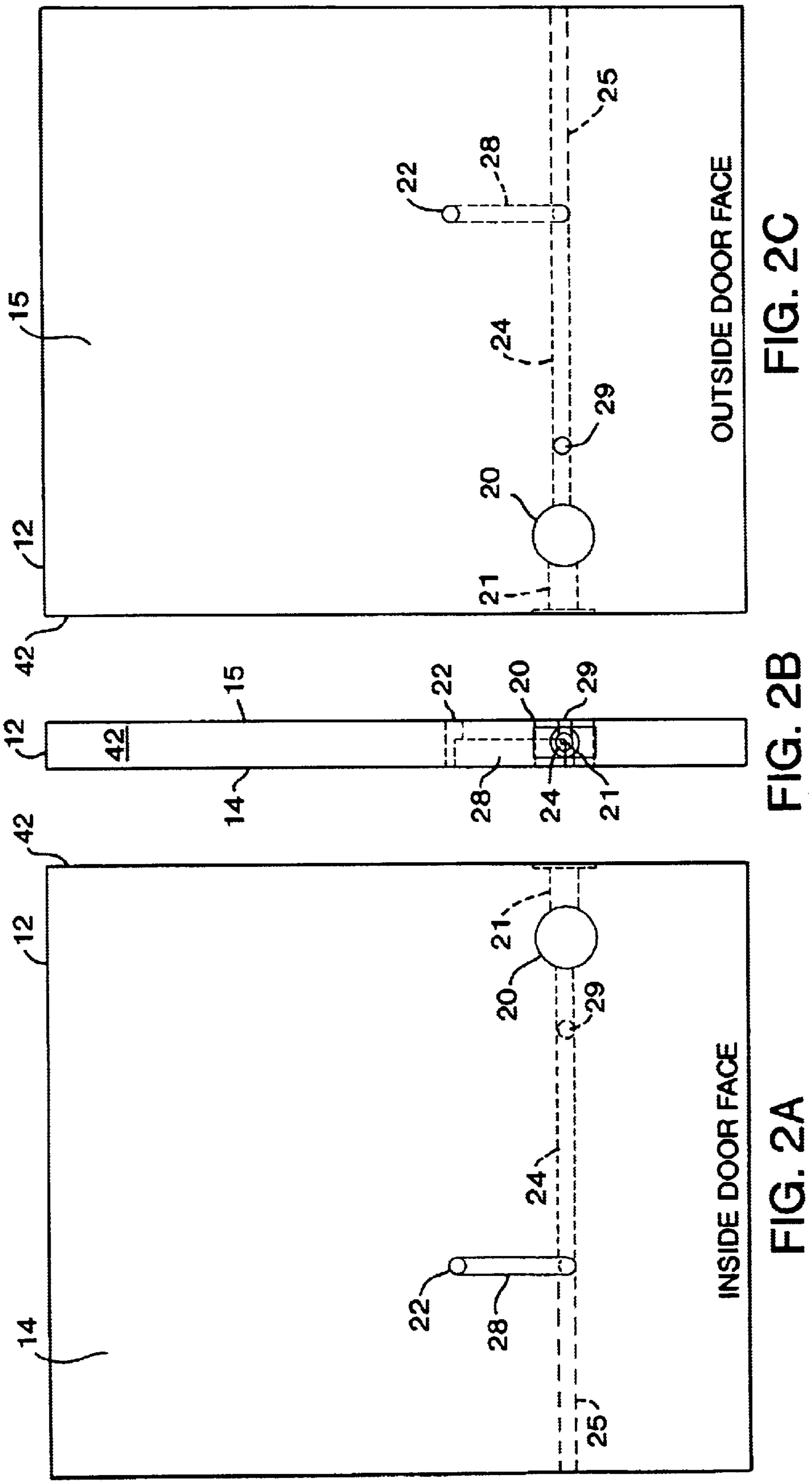
FIG. 2A is a partial front view, partly in phantom, of a door prepared for installation of the modular electronic door security system as configured in FIGS. 1A and 1B.
FIG. 2B is a partial side view, partly in phantom, of the door of FIG. 2A.
FIG. 2C is a partial rear view, partly in phantom, of the door of FIG. 2A.

FIGS. 2A–2C illustrate the preparation of a solid core door to receive the components which together form the modular electronic door security system 10. A first bore 20 is created between the inside and outside faces 14, 15 of the door 12 to accommodate installation of a lockset. A second bore 21 transversely intersects with the first bore 20 to accommodate projection of a latch 17 from the latch edge 42 of the door 12. The first bore 20 and second bore 21 represent the typical preparation of a door for the installation of a cylindrical latch lockset.

Door preparation for the embodiment of the modular electronic door security system illustrated in FIGS. 2A–2C, 3, 4, 12, 13 and 14 must include pathways for the necessary electrical connections between the modular components comprising the system. For this purpose, a third bore 22 must be created between the inside face 14 and the outside face 15 of the door at a location selected for mounting of an input device. This bore 22 will serve as a pathway for conductors connecting an input device 40 to the control module 30. A fourth bore 24, coaxial with the second bore 21, penetrates the core of the door generally perpendicular to the latch edge 42. The fourth bore 24 penetrates toward the hinge edge 44 and terminates at a location vertically above or below the third bore 22. Whether the fourth bore 24 will terminate above or below the third bore 22 depends on the location selected for installation of the input device 40.

A slot 28 is then formed on the inside door face 14 connecting the fourth bore 24 with the third bore 22. A partial bore 29 is drilled in the outside door face 15 to connect with the fourth bore 24. The object of the partial bore 29, fourth bore 24 and slot 28 is to form a conductor pathway from the location selected for the third bore 22 (the mounting location of the input device and control module) and the electrically actuated portions of the lockset 16. The slot 28 will be covered by the control module 30 or other trim to create a finished appearance on the inside face 14 of the door 12.

Figure 14:
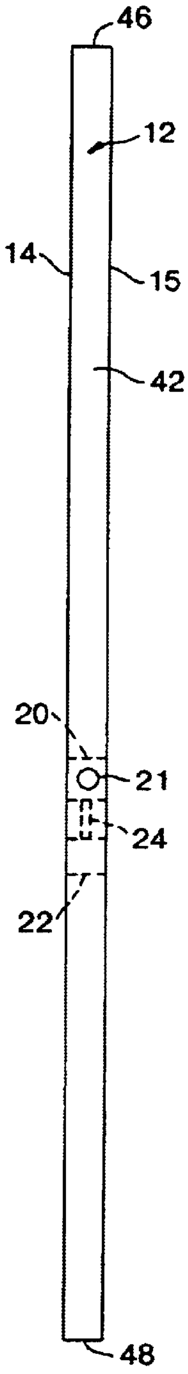
FIG. 14 is a side view, partly in phantom, of the door of FIG. 13.
Figure 13:
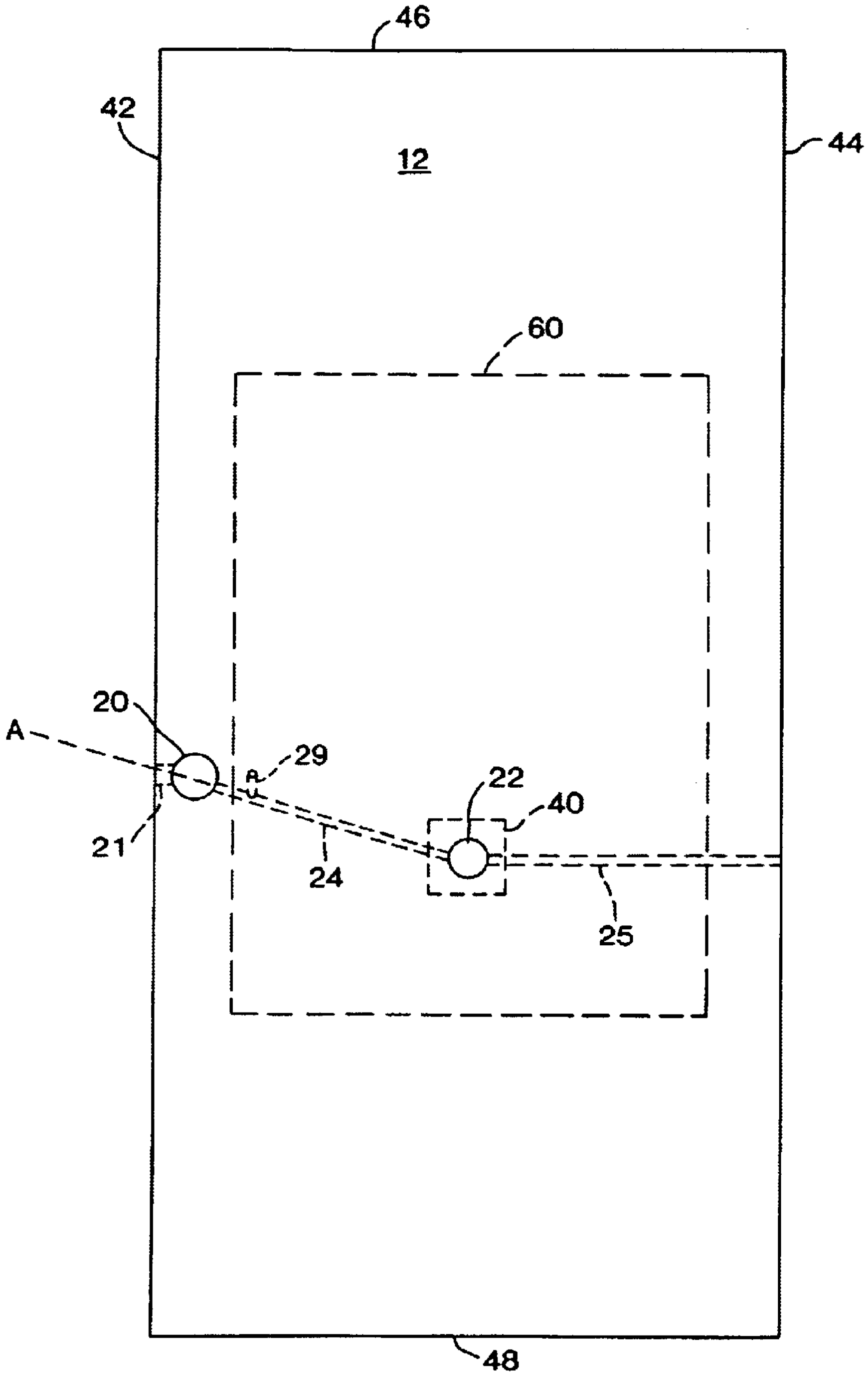
FIG. 13 is a frontal view, partly in phantom, of a door which has been prepared for installation of the modular electronic door security system in accordance with the present invention.

FIGS. 13 and 14 present an alternative approach to preparation of a solid core door. FIG. 13 illustrates the outside face 15 of a door 12 where the input device 40 is to be mounted in the center of the outside face 15 of the door and several inches below the lockset. Rather than drill the fourth bore perpendicular to the latch edge 42 of the door, the fourth bore 24 is drilled along line A to intersect directly with the third bore 22. The previously created first bore 20 and second bore 21 will allow the fourth bore 24 to be oriented at a range of angles to the latch edge 42. The angles available allow a direct path between component locations to be formed internally, without resort to opening a slot on the inside face of the door. This configuration may be useful for a combined input/control module having no component mounted to the inside face 14 of the door 12. In this configuration, partial bore 29 may take the form of a short slot connecting the fourth bore 24 with the area to be covered by the outer escutcheon assembly 50 (see FIG. 13).

Doors may be prepared and the components of the modular electronic door security system installed prior to delivery to the construction site. Factory configured doors relieve the installer of the need to bore holes and/or run wires through the interior of the door. The angled boring necessary to the installation illustrated in FIGS. 13 and 14 can be accurately accomplished in a factory setting. A factory installation allows for quality control of the electro-mechanical aspects of the installation as well as the fit, finish and cosmetic appearance of the modular electronic door security system.

Figure 3:
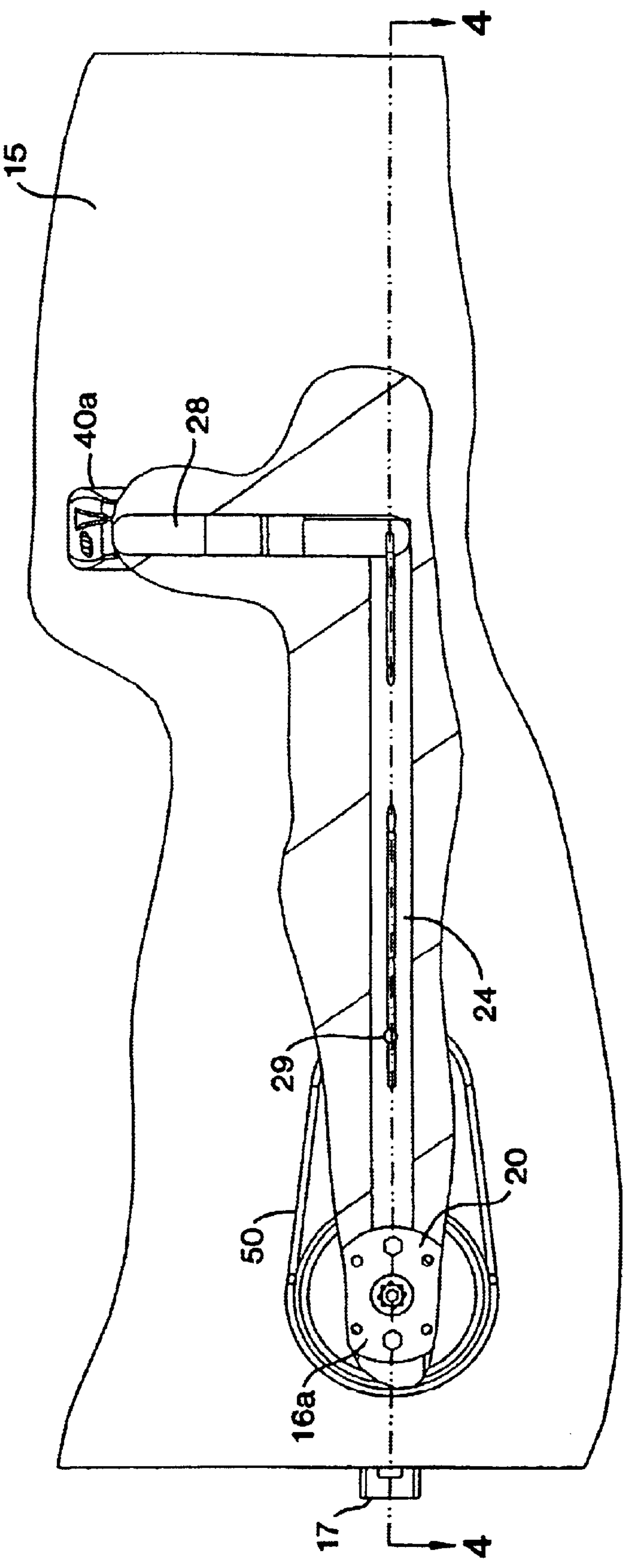
FIG. 3 is a fragmentary front view, partly broken away, of the modular electronic door security system of FIG. 1A.
Figure 4:
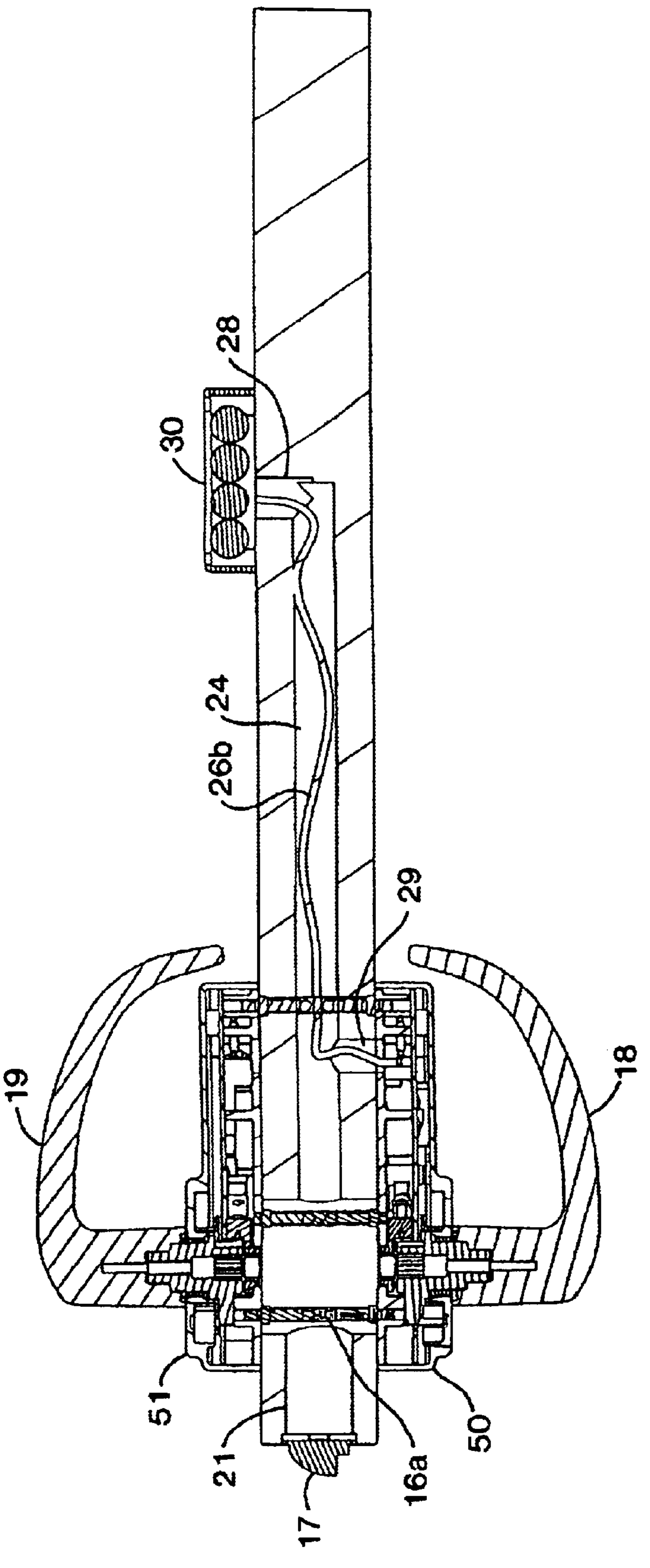
FIG. 4 is a partial sectional view of the modular electronic door security system of FIG. 3, taken along line 4—4 thereof.

With reference to FIGS. 3 and 4, the input device 40*a* is electrically connected to the control module 30 by conductors which travel through the third bore 22 between the outside face 15 and the inside face 14 of the door 12. The control module 30 is electrically connected to the lockset 16*a* by conductors 26*b* which are routed through the slot 28, fourth bore 24 and partial bore 29. The outer escutcheon assembly 50 contains the electrically actuated components of the lockset 16*a*. The outer escutcheon assembly 50 also covers partial bore 29.

Installation of the modular electronic door security system is simplified when the door is hollow, such as a hollow steel door. Preparation of a hollow door consists of creating through bore 22 and partial bore 29 in addition to the bores 20, 21 necessary for installation of the lockset 16. Electrical connections between component locations are easily made through the hollow space within the door 12. Advantageously, conductors routed through the interior of the door cannot be tampered with and do not mar the appearance of the door.

Communication between the components of the modular electronic door security system may also be accomplished using wireless technology. Wireless communication links eliminate the need for much of the boring required for wired installations. FIG. 12A illustrates an alternative embodiment of the modular electronic door security system incorporating wireless communication technology. Known methods of short distance wireless communication include optical infrared, optical laser or radio frequency (RF) systems. Either the input device 40 or the control module 30 may be provided with an optical or radio transmitter 34*a*, 32*a*. The inner or outer escutcheon may be provided with a compatible optical or radio receiver 34*b*, 32*b*. The communication link 34*c*, 32*c* established between the location of the input/control components and the location of the electro-mechanical lockset allows actuation of the lockset in the same manner as a conductor.

It is possible to combine the input and control functions in one module (not illustrated). A combined input/control module may not require that bore 22 pass through the inside face 14 of the door 12. Alternatively, the control module of the system may be installed within the interior space of a hollow door, in which case an opening may be made on the inside door face to provide access to the control module for necessary service (battery changes, programming, etc.). A combined input/control module may eliminate the need for access to the module through the inside face of the door altogether. Necessary service may be performed from the unsecured side of the door, provided that measures are taken to prevent unauthorized access to sensitive portions of the control module.

For some installations, it may be necessary to connect the modular electronic door security system to facility based power or security systems. FIGS. 2A, 2C and 13 illustrate bore 25, which connects the conductor pathways in the door to the hinge edge 44 of the door 12. It is known in the art to connect door mounted components to facility-based systems through the hinge edge of the door.

While the modular electronic door security system 10 makes it possible to install the input and control modules anywhere on the surface of a door 12, the invention is particularly directed to installation of the input and control modules in a central portion of the door. As used herein, central portion refers to an area of the face of the door more than ⅛th of the width of the door from both the latch edge 41 and the hinge edge 44 and more than ¼th of the height of the door from both the top edge 46 and the bottom edge 48. The central portion 60 of the door is illustrated by the broken line rectangle on FIG. 13.

Figure 12:
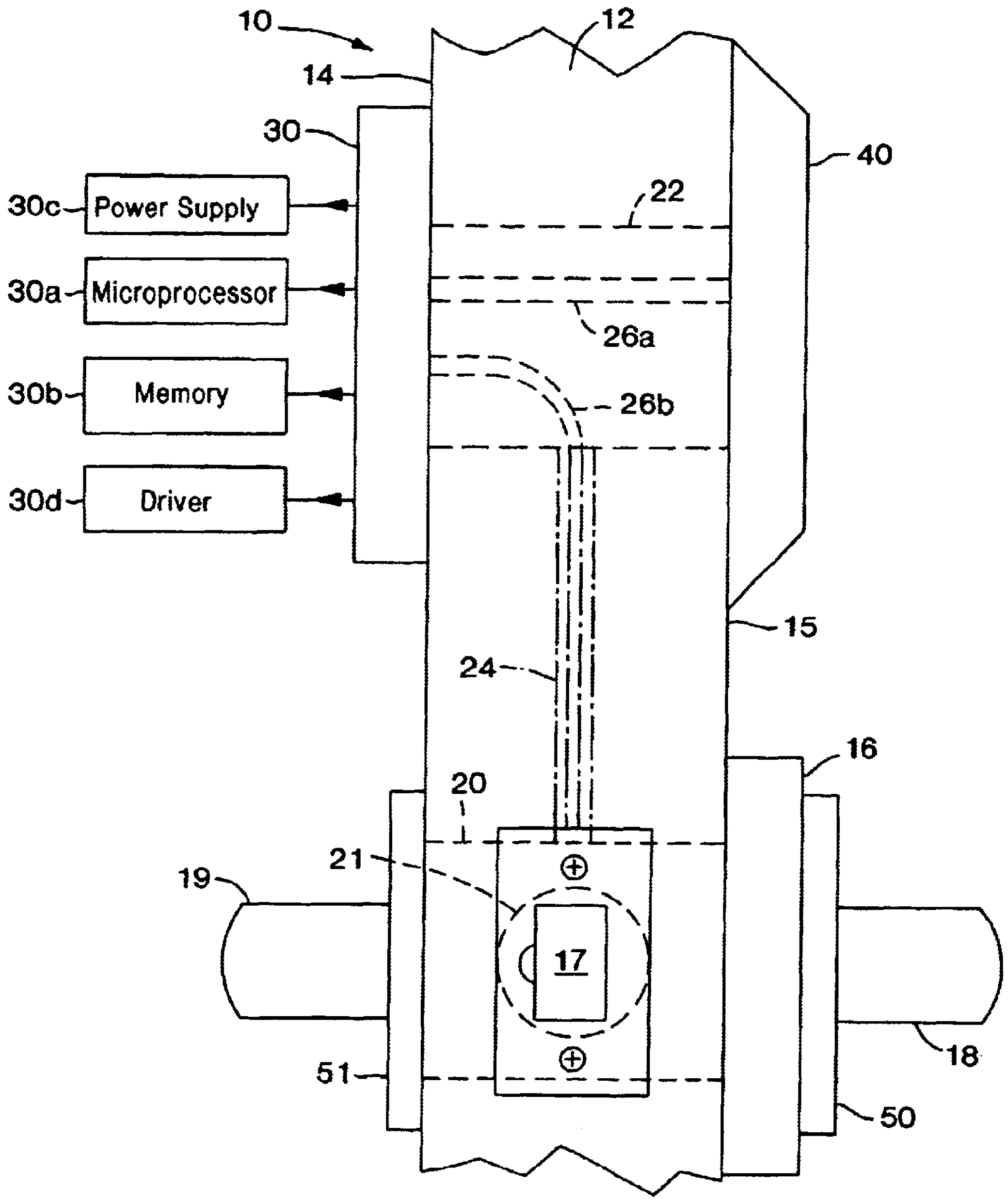
FIG. 12 is a fragmentary side view of a door incorporating a modular electronic door security system in accordance with the present invention.
Figure 12A:
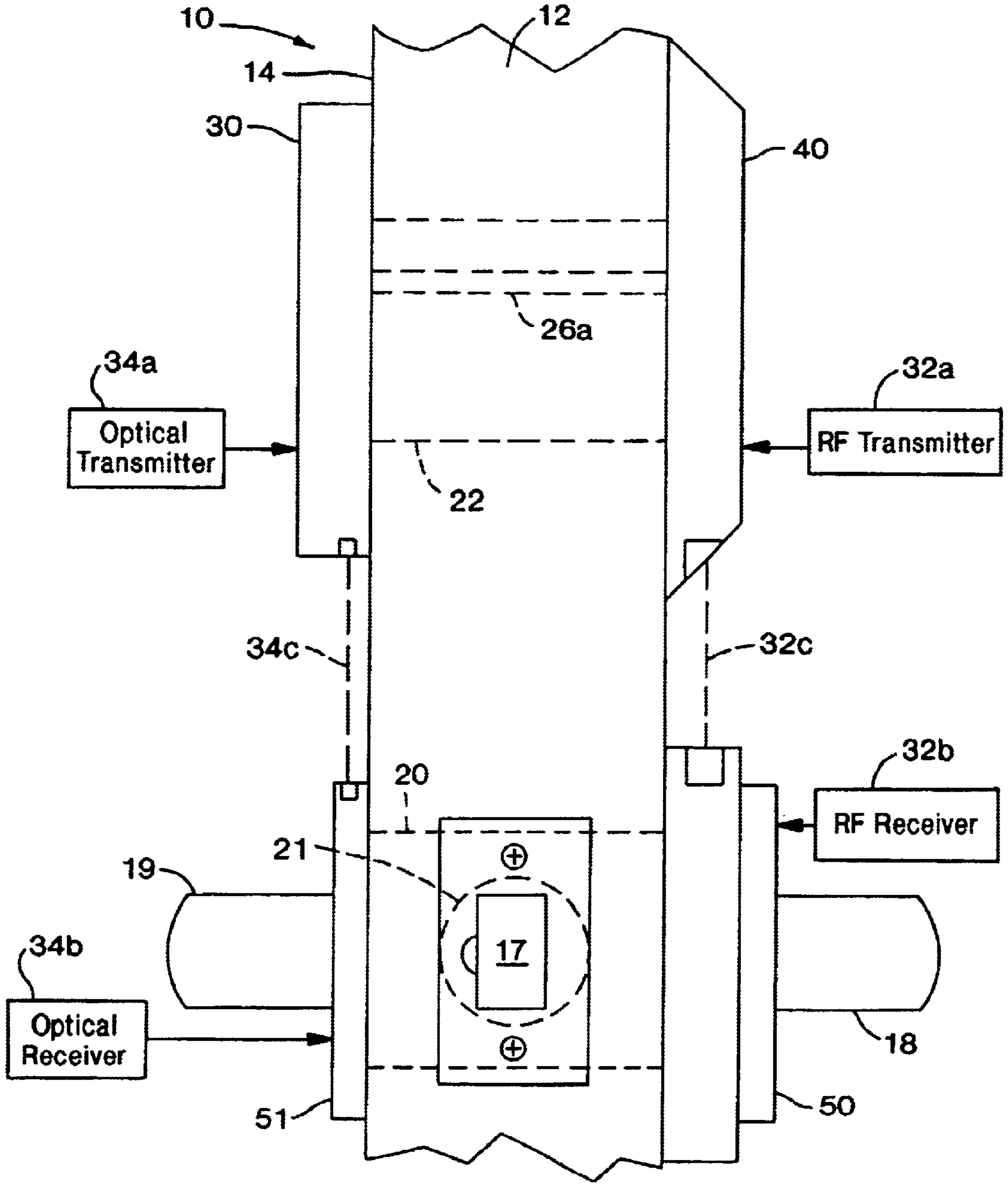
FIG. 12A is a fragmentary side view of a door incorporating an alternative embodiment of the modular electronic door security system in accordance with the present invention.

Inputs from the input device 40 are transmitted to the control module 30 by conductors 26*a* as illustrated in FIG. 12. The control module 30 comprises a micro-processor 30*a*, memory 30*b*, a battery or other form of power supply 30*c* and a driver 30*d* for the electro-mechanical lockset. Received inputs are compared by the microprocessor 30*a* to valid inputs stored in memory 30*b*. Upon detection of a valid input, the micro-processor 30*a* generates a signal to the driver to actuate the micro-motor in the electro-mechanical lockset 16. Only upon detection of a valid input will the control module 30 activate the lockset 16.

Figure 7:
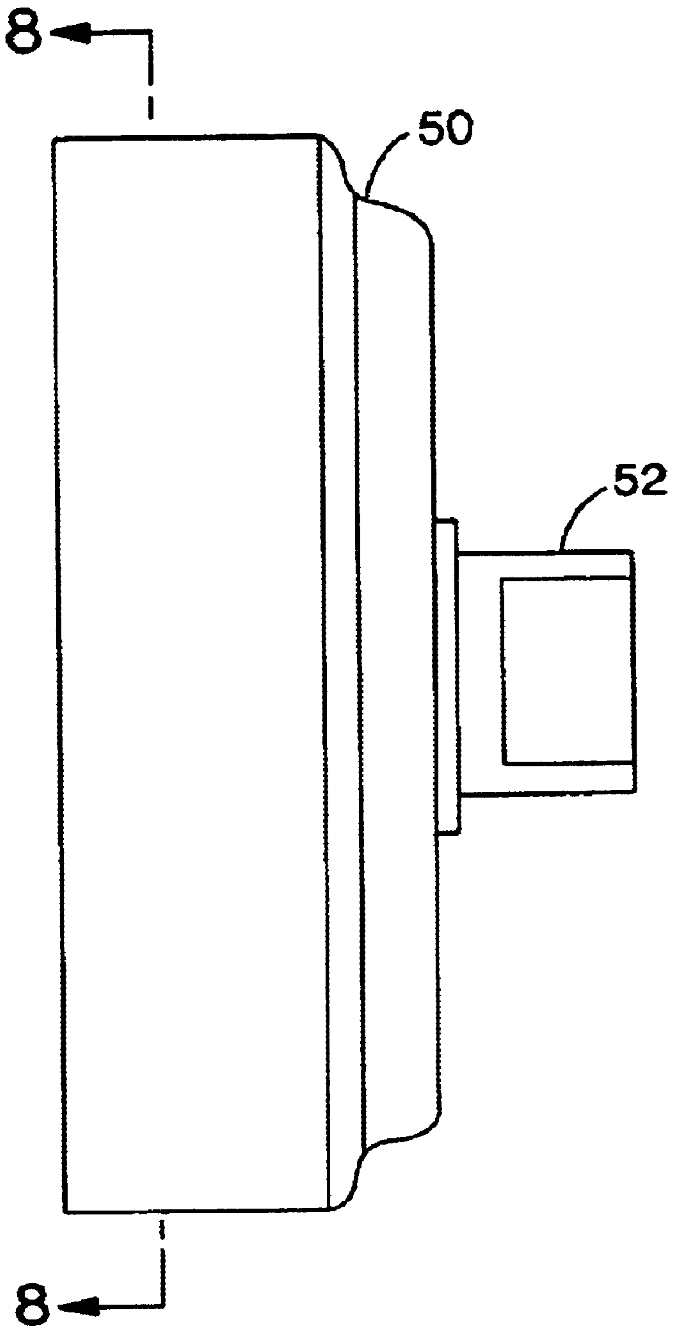
FIG. 7 is a side view of the outside escutcheon assembly of a lock set which forms part of the modular electronic door security system in accordance with the present invention.
Figure 8:
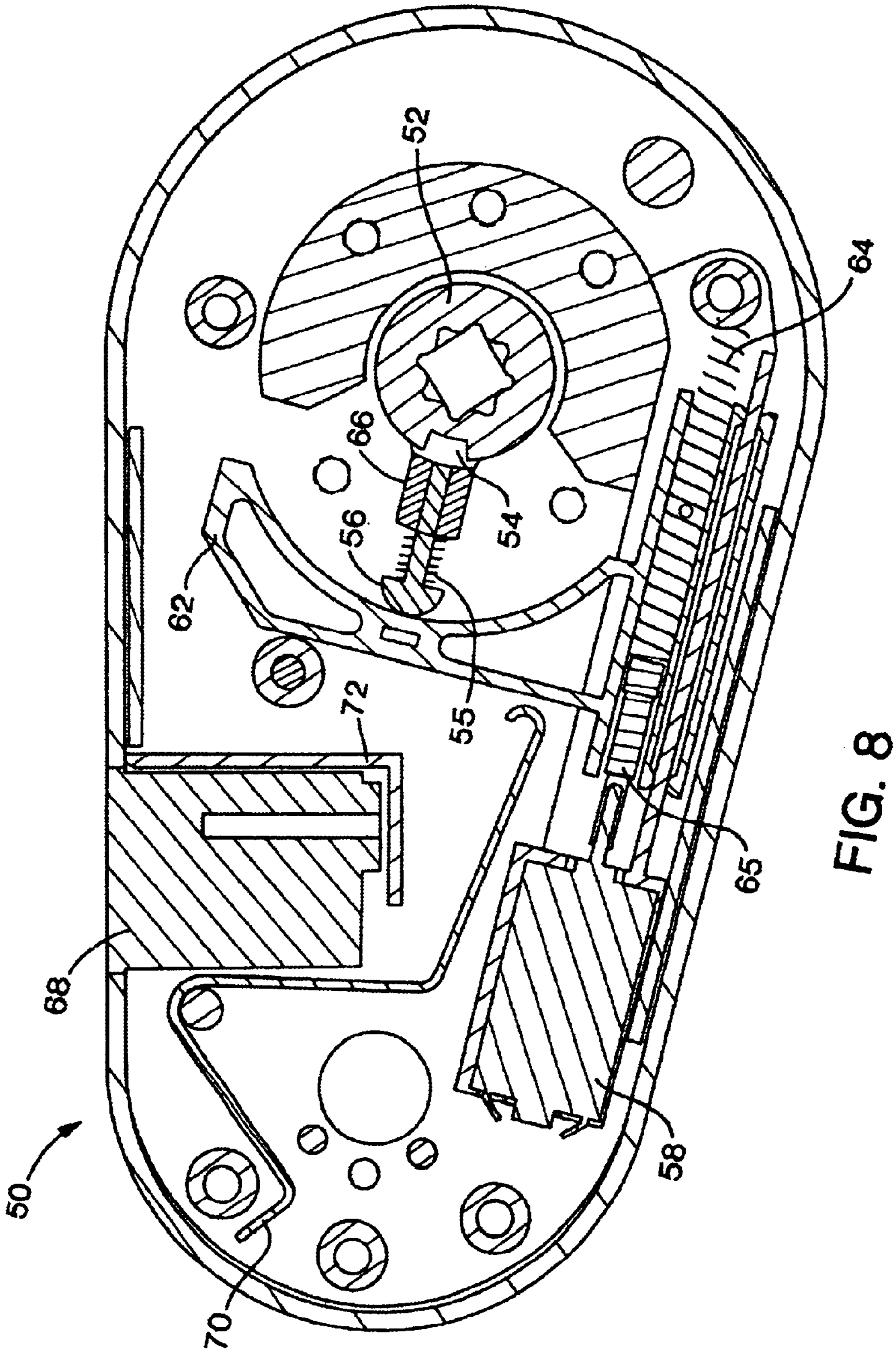
FIG. 8 is a cross-sectional view of the outside escutcheon assembly of FIG. 7 taken along line 8—8 thereof.

The electro-mechanical lock set 16 incorporates a clutch mechanism in the outer escutcheon assembly 50. FIG. 7 is an end view of the outer escutcheon assembly 50. The handle 18 will be mounted to the hub 52 which protrudes from the outer escutcheon assembly 50. With reference to FIG. 8, the hub 52 has a notch 54 for reception of an engagement pin 56. The engagement pin 56 carried by an interface cam 66 and is biased toward a disengaged position by engagement pin spring 55. The interface cam 66 is mechanically linked to other parts of the lockset so that rotation of the interface cam 66 will retract the latch and open the door. When the engagement pin 56 is in a disengaged position, the hub 52 turns independently of the interface cam.

Figure 9:
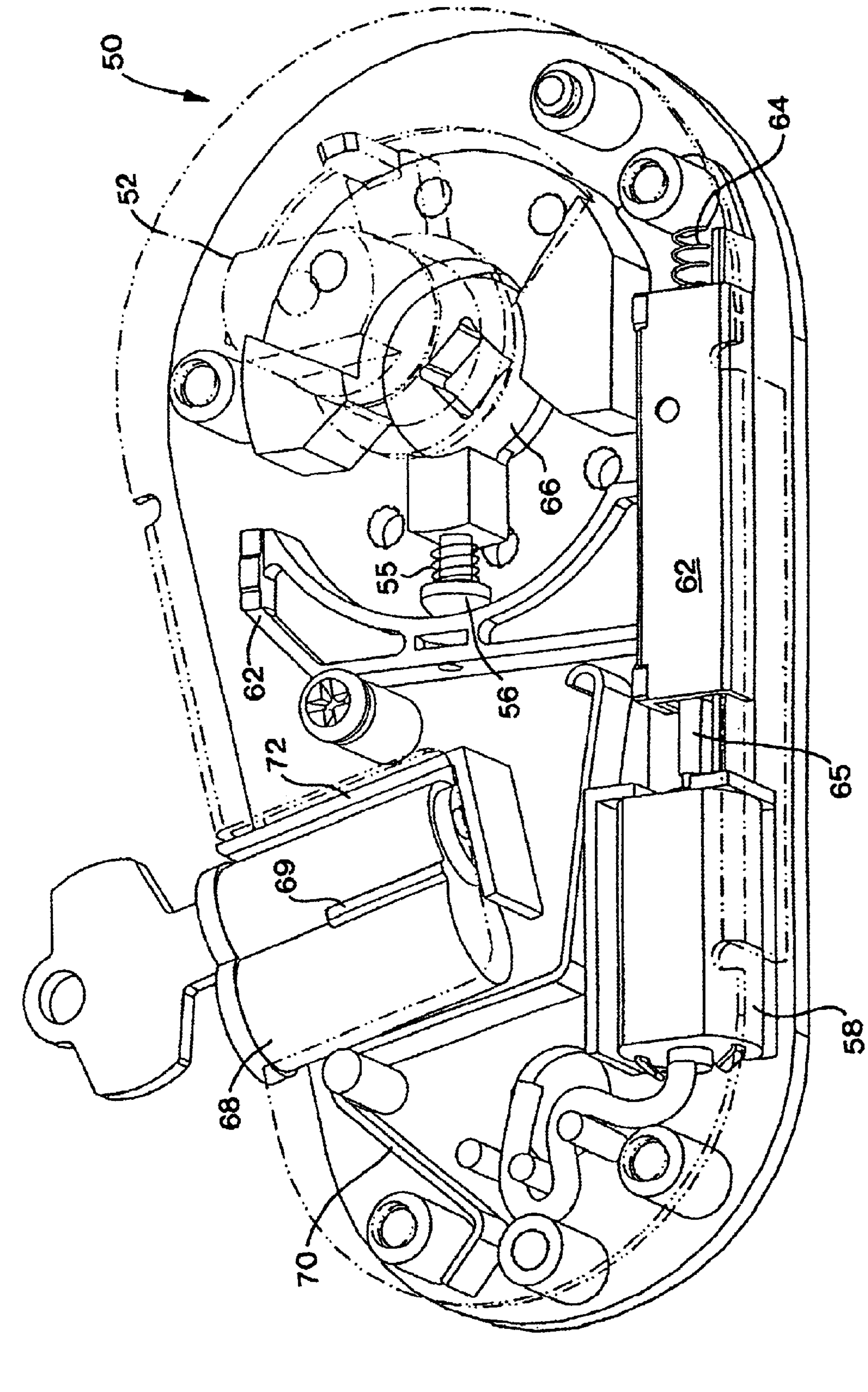
FIG. 9 is an interior perspective view, partly in phantom, of the outside escutcheon assembly of FIG. 7 with the components in a locked configuration.

FIG. 9 illustrates the internal components of the outer escutcheon assembly 50 in a locked configuration. In a locked configuration, the key cylinder 68 is installed and restrains the override spring 70 in a non-override position. The micro motor 58 is not activated and the position of the moving wall 62 allows the spring biased engagement pin 56 to remain in the disengaged position. Movement of the hub 52 will have no effect on the interface cam 66 and the rest of the lockset when the internal components are positioned as shown in FIG. 9.

Figure 10:
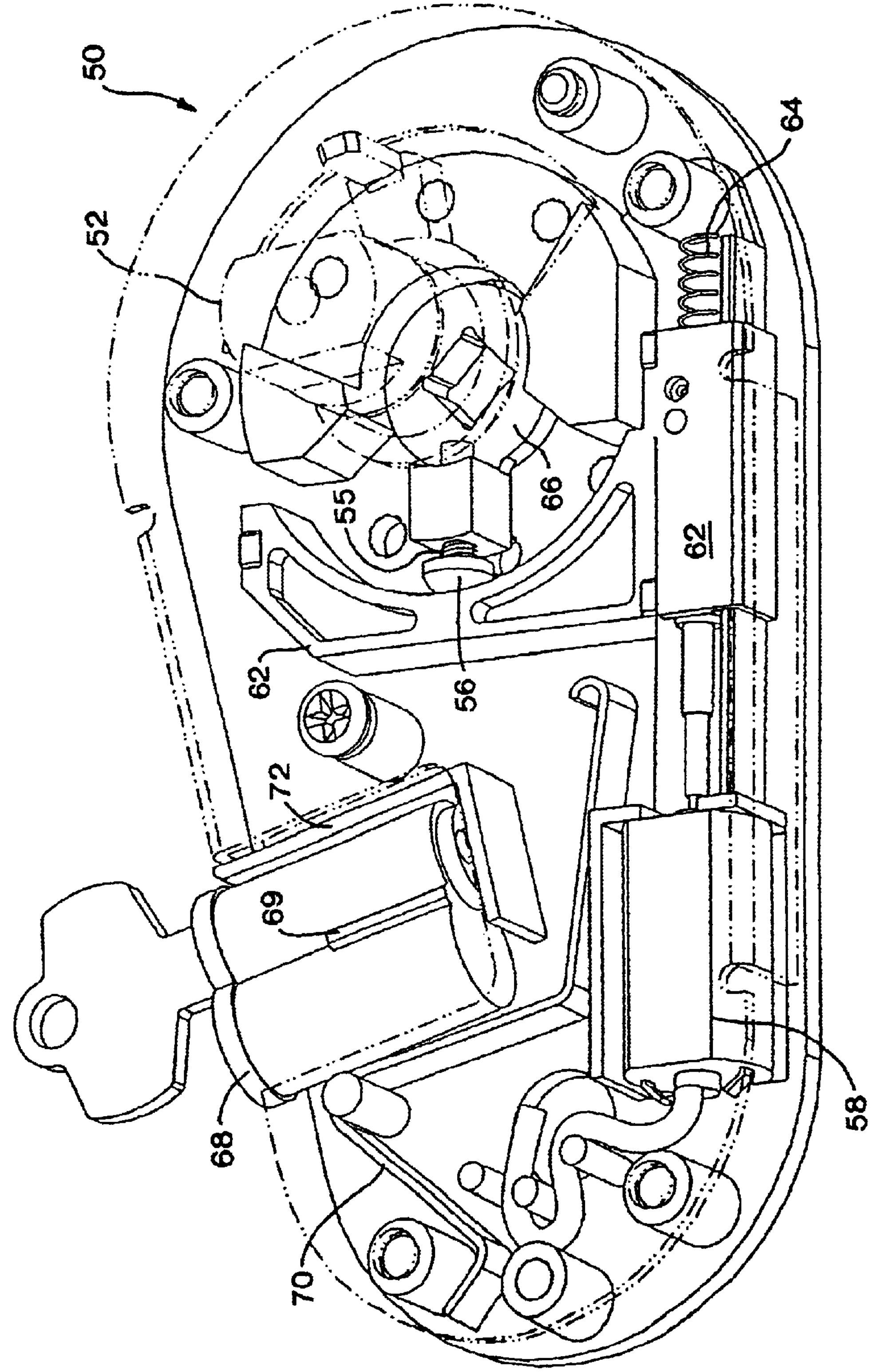
FIG. 10 is an interior perspective view, partly in phantom, of the outside escutcheon assembly of FIG. 7 with the interior components illustrated in an unlocked configuration.

FIG. 10 illustrates the internal components of the outer escutcheon assembly 50 in an unlocked configuration. The micro motor 58 has been activated, rotating the drive shaft 65 and drive spring 64 to shift the moving wall 62 and force the engagement pin 56 into engagement with the notch 54 in the hub 52. The hub 52 and interface cam 66 are thus mechanically linked and rotation of the hub 52 results in a corresponding rotation of the interface cam 66. When the moving wall 62 and engagement pin 56 are positioned as illustrated in FIG. 10, the door is in an unlocked configuration, i.e., the hub 52 and the interface cam are mechanically linked and movement of the outside handle 18 will result in retraction of the latch 17 from its projected, latched position.

The embodiment of the outer escutcheon assembly 50 illustrated in FIGS. 8–11, incorporates a novel override arrangement. An override spring 70 is restrained in a non-override position by the presence of a removable key cylinder 68. The key cylinder includes a retractable lug 69 which projects to retain the key cylinder 68 in place within a receiver 72 in the outer escutcheon assembly 50.

Figure 11:
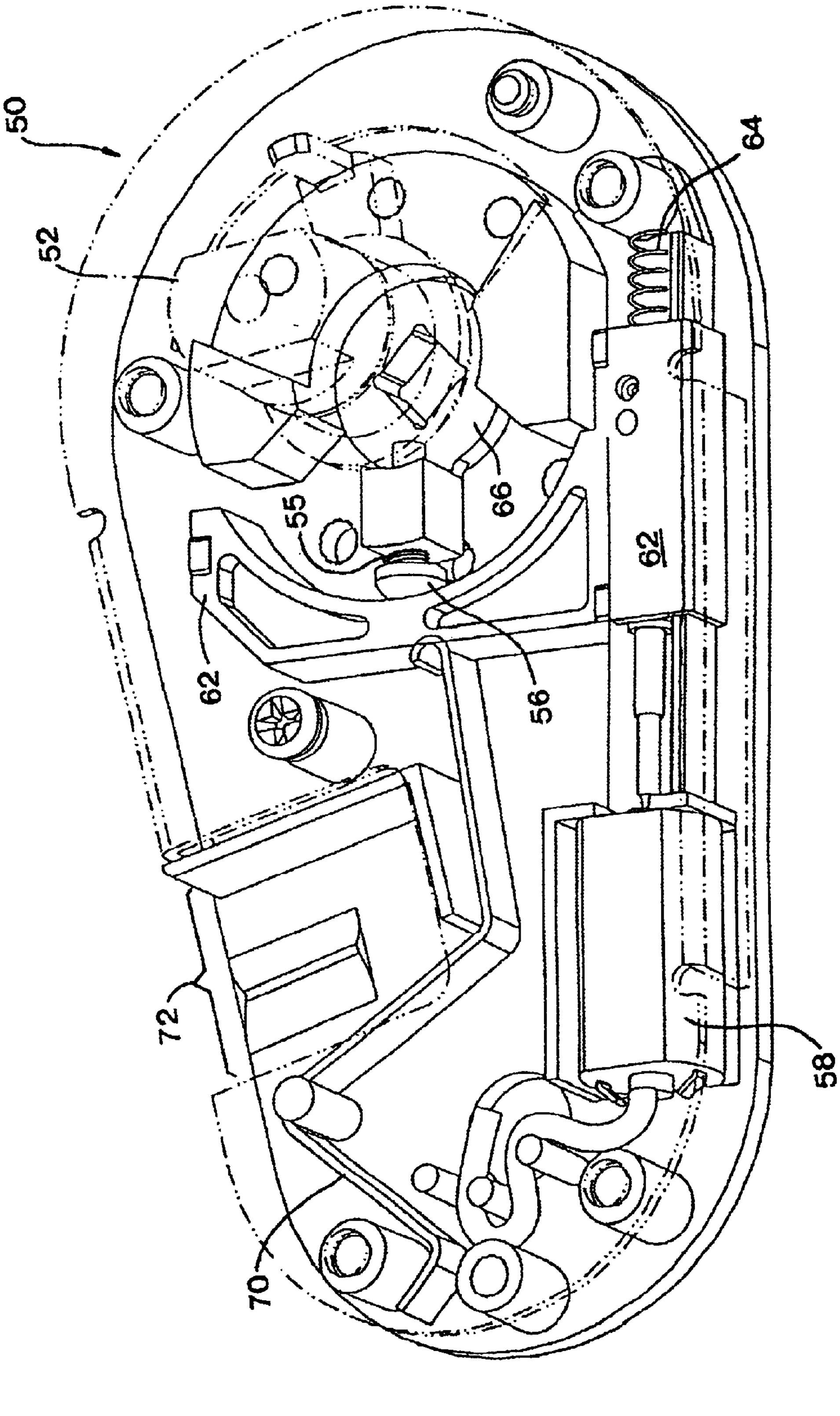
FIG. 11 is an interior perspective view, partly in phantom, of the outside escutcheon assembly of FIG. 7 with the interior components illustrated in an override configuration.

FIG. 11 illustrates the components of the outer escutcheon assembly 50 in an override configuration. In this configuration the key cylinder 68 is removed from its receiver. When the key cylinder 68 is removed the unrestrained key override spring 70 exerts sufficient force on the moving wall 62 to overcome the countervailing forces of the engagement pin spring 55 and drive spring 64. As a result, the moving wall 62 shifts toward the unlocked position and urges engagement pin 56 into engagement with the hub 52. In this manner, upon failure of the electronic or electro-mechanical portions of the modular electronic door security system 10, access to secured areas is still possible.

Figure 11A:
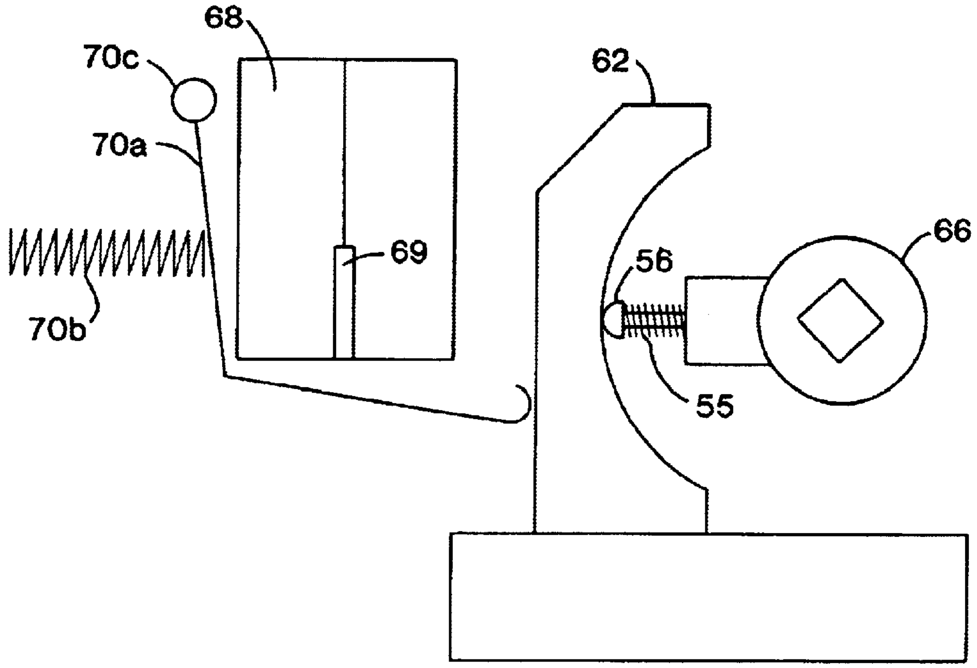
FIG. 11A is a schematic representation of the components of an alternative embodiment of the key override in accordance with the present invention.

FIG. 11A illustrates an alternative embodiment of the override arrangement in the non-override position. In the alternative embodiment, the override spring 70 is replaced by a rigid link 70*a* having a pivot 70*c* and bias spring 70*b*. Bias spring 70*b* urges the link 70*a* toward the override position. The key cylinder 68 is installed, restraining the link 70*a* from achieving the override position.

Figure 5A:
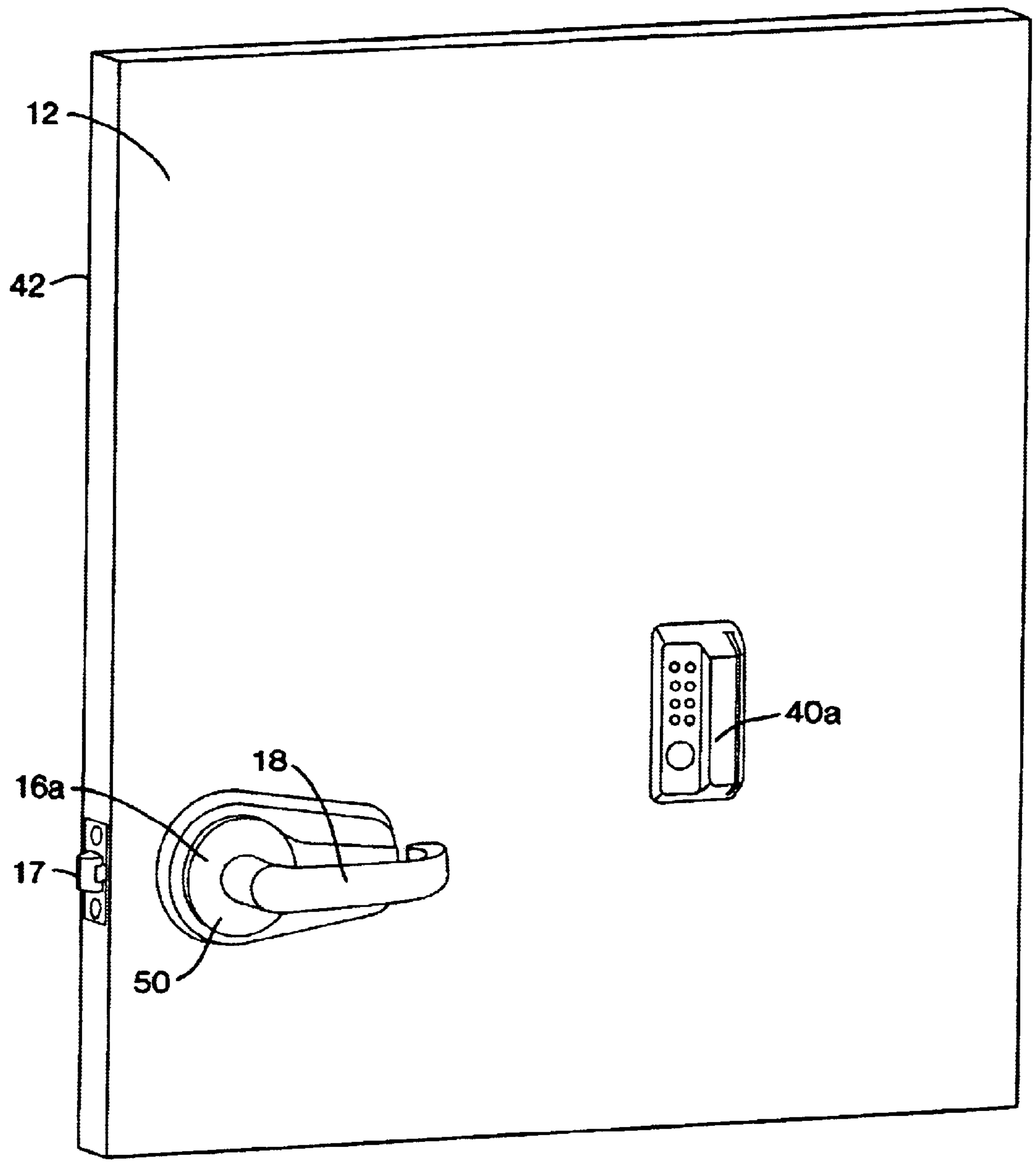
FIG. 5A is a fragmentary frontal perspective view of a door incorporating an alternative embodiment of the modular electronic door security system in accordance with the present invention.
Figure 5B:
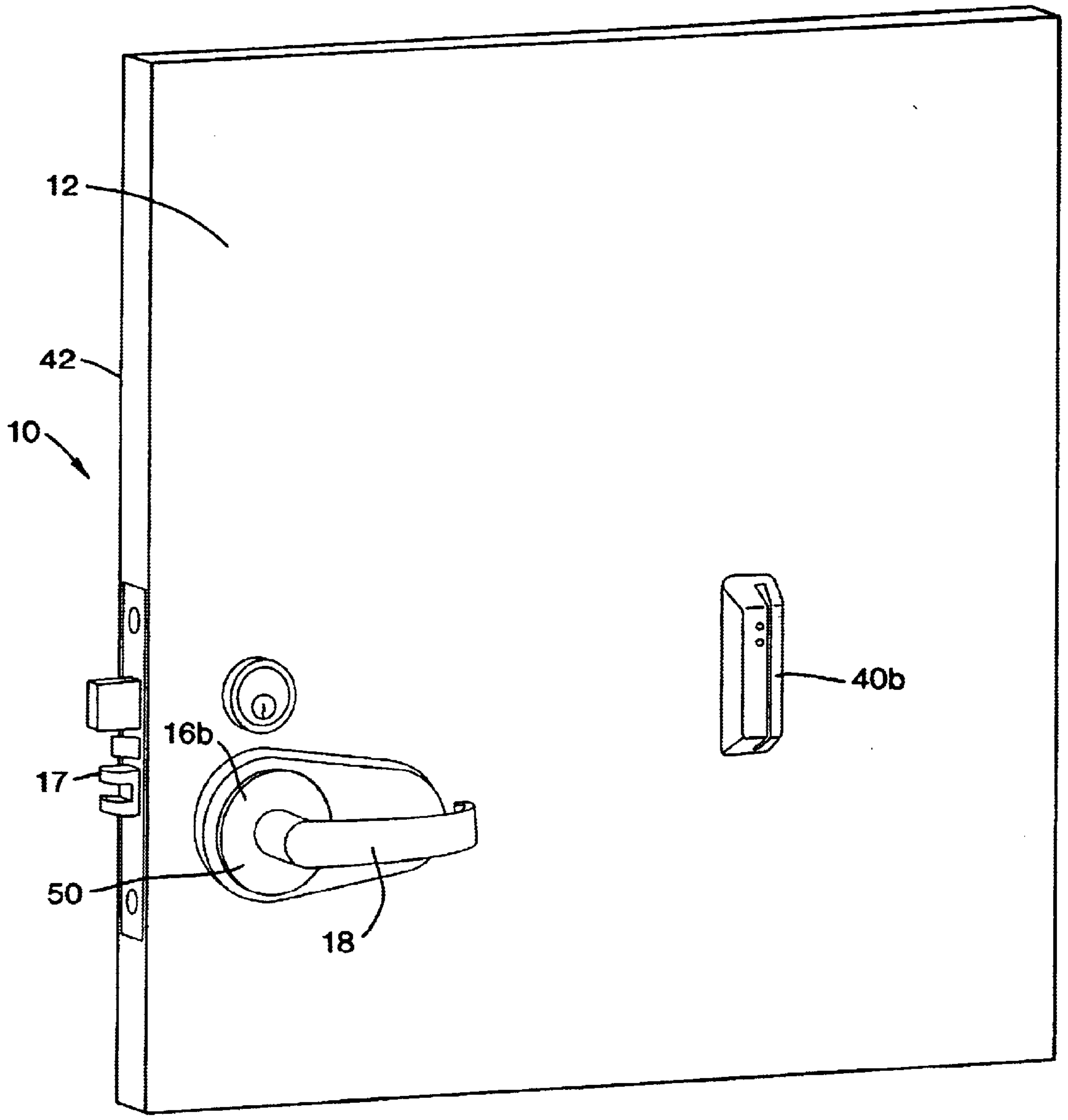
FIG. 5B is a fragmentary frontal perspective view of a door incorporating an alternative embodiment of the modular electronic door security system in accordance with the present invention.
Figure 6:
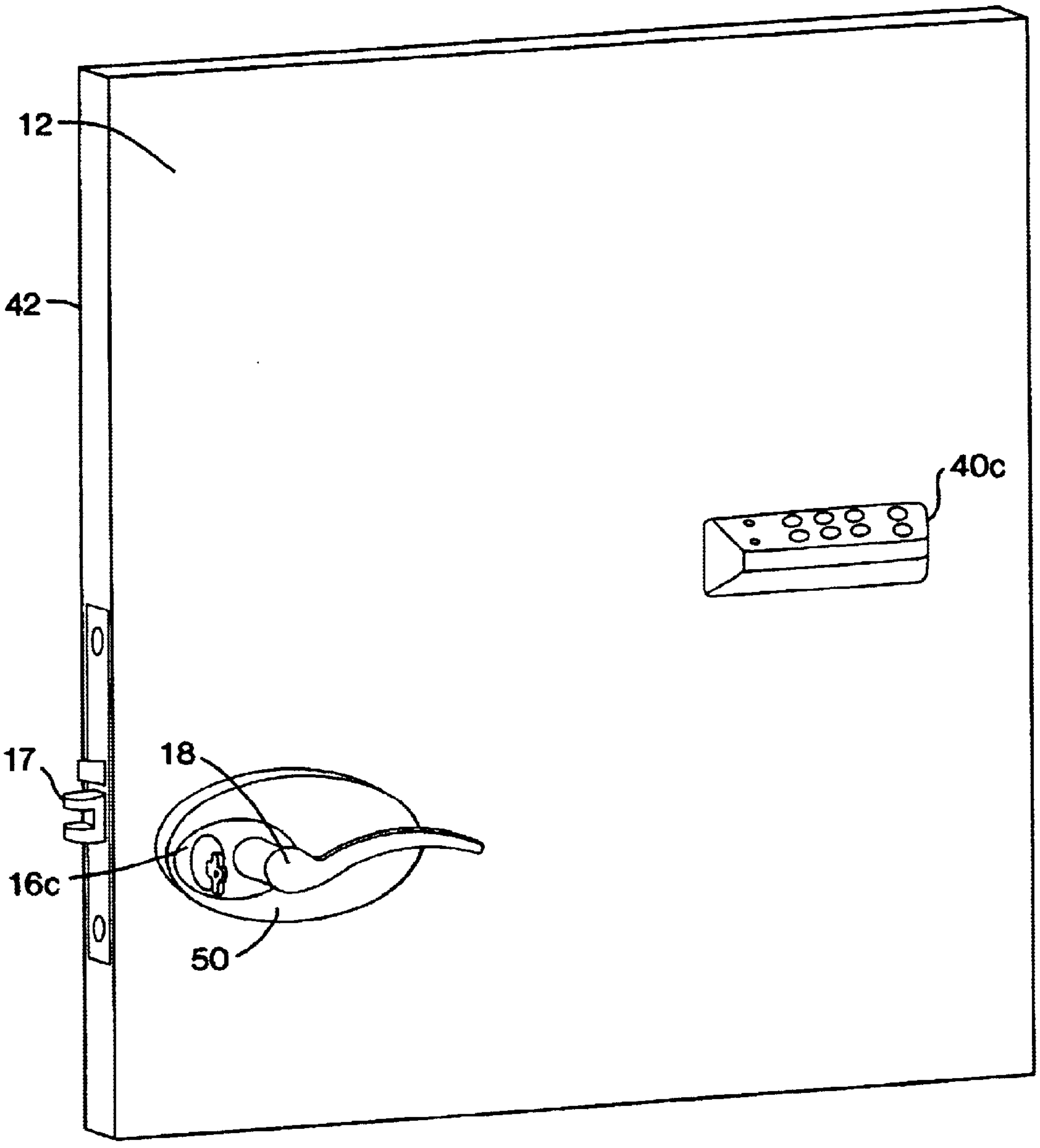
FIG. 6 is a fragmentary frontal perspective view of a door incorporating an alternative embodiment of the modular electronic door security system in accordance with the present invention.

Many alternative input devices may be utilized to control access through the door 12. FIG. 5A illustrates a combination input device 40*a* which incorporates a card reader, key pad and contact activatable dataport. FIG. 5B illustrates a modular electronic door security system 10 incorporating an input device 40*b* consisting of a card reader. FIG. 6 illustrates a modular electronic door security system 10 incorporating an input device 40*c* consisting of a key pad. Other possible input devices may include smart cards, palm scanners, retina scanners, voice recognition systems, and the like. FIGS. 5A, 5B and 6 also illustrate that the modular electronic door security system is compatible with standard cylindrical latch locksets 16*a*, locksets including mortise deadbolts 16*b* suitable for the hospitality industry, and mortise latch locksets 16*c*.

While preferred embodiments of the foregoing invention have been set forth for purposes of illustration, the foregoing descriptions should not be deemed a limitation of the invention herein. Accordingly, various modifications, adaptations and alternatives may occur to one skilled in the art without departing from the spirit and the scope of the present invention.

What is claimed is:

1. A modular door security system for controlling access through a door, the modular door security system comprising:

- a housing supported on said door, said housing defining a recess and having a lockset, said lockset being operable to secure said door in a closed position;
- a handle rotatably supported by said housing;
- a clutch mechanism arranged between said handle and said lockset, said clutch mechanism being moveable between an engaged position, in which said clutch mechanism mechanically couples said handle and said lockset, and a non-engaged position;
- an override device moveable between a first position, in which said override device is spaced a distance from said clutch mechanism, and a second position, in which said override device biases said clutch mechanism toward said engaged position; and
- a key cylinder selectively insertable in said recess in said housing to bias said override device toward said first position, said override device being moveable toward said second position when said key cylinder is removed from said recess.

2. The modular door security system of claim 1, further comprising:

- an input console operable to receive an input and being in communication with said clutch mechanism; and
- a control module in communication with said input console and said clutch mechanism, said control module storing a set of valid inputs, said control module comparing said input to said set of valid inputs and directing said clutch mechanism to move toward said engaged position when said input matches said set of valid inputs.

3. The modular door security system of claim 2, wherein said clutch mechanism includes a motor, said motor being in communication with said control module, and wherein directing said clutch mechanism to move toward said engaged position when said input matches said set of valid inputs includes transmitting an activation signal from said control module to said motor.

4. The modular door security system of claim 1, wherein said clutch mechanism includes an engagement pin and a rotatable hub, said hub being fixedly coupled to said handle and defining a second recess, and wherein said engagement pin extends into said second recess when said clutch mechanism is in said engaged position.

5. The modular door security system of claim 2, wherein said input console is equipped with an input device selected from the group consisting of: a magnetic card reader, a keypad, a keypad/card reader combination, a contract activatable dataport, and a keypad/card reader/contact activatable dataport combination.

6. The modular door security system of claim 1, wherein said door is of metal construction.

7. The modular door security system of claim 2, wherein at least one of the input console, control module and clutch mechanism receives power from a battery power supply.

8. The modular door security system of claim 2, wherein said door has a first surface, a second surface opposite said first surface, a hinge surface extending between said first surface and said second surface, and wherein at least one of said input console, control module and clutch mechanism receives power through wires connected through said hinge edge of said door.

9. The modular door security system of claim 1, wherein said lockset comprises a configuration selected from the group consisting of: a key-operable mortise dead bolt, a mortise latch bolt and a cylindrical latch.

10. The modular door security system of claim 2, wherein said door has a first surface and a second surface opposite said first surface, and wherein said clutch mechanism has a first location and said control module has a second location, and said modular door security system further comprising an electrical connection extending between said clutch mechanism and said control module, said electrical connection including at least a pair of conductors, said door defining a passage disposed between said first and second surfaces and connecting said first and second locations, the at least a pair of conductors traversing said passage.

11. The modular door security system of claim 2, wherein said door has a first surface and a second surface, and wherein said clutch has a first location and said control module has a second location, a cavity being defined between said first and second surfaces, and said modular door security system includes an electrical connection between said clutch mechanism and said control module comprising a pair of conductors, said conductors traversing said cavity between said first location and said second location.

12. The modular door security system of claim 2, wherein said control module transmits signals to said clutch mechanism by wireless communication.

13. A modular door security system comprising:

a door having opposite first and second surfaces, a hinge edge and a latch edge separated by a first distance, an upper edge and a lower edge separated by a second distance, said second surface having a central portion comprising an area of said second surface at least ⅛ of said first distance from said hinge edge and said latch edge and at least ¼ of said second distance from said upper edge and said lower edge;

a lockset installed adjacent to said latch edge, said lockset including a latch projectable through said latch edge, an interior handle projecting from said first surface and an exterior handle projecting from said second surface, said interior handle capable of retracting said latch from a projected latched position;

a clutch mechanism which creates a selective mechanical coupling between said exterior handle and said lockset, said coupling enabling said exterior handle to retract said latch from said latched position;

an input console which receives an input, said console located on said second surface in said central portion of said second surface; and a control module including a memory containing a set of valid inputs, comparison means for comparing an actual input to the set of valid inputs and signal generation means for generating an actuating signal to said clutch, said control module able to exchange signals with said input device and transmit signals to said clutch mechanism;

wherein said control module, upon reception of a valid input, generates an actuation signal to said clutch causing said clutch to mechanically couple said exterior handle to said lockset;

wherein said lockset includes said clutch mechanism and a key override mechanism comprising:

a key;

a key cylinder complementary to said key, said cylinder having an exterior surface and a retractable lug projecting from said exterior surface, said member retracting in response to insertion of said key; and an override device having an override position and a non-override position, said override position creating said mechanical coupling between said exterior handle and said lockset, said override device being biased toward the override position;

said lockset having a receiver configured to receive said key cylinder and retain said cylinder when said lug is projecting from said exterior surface and release said key cylinder when said lug is retracted;

wherein a received key cylinder impedes said override device from achieving said override position and removal of said key cylinder permits said override device to achieve said override position.

14. The modular door security system of claim 13, wherein said override device comprises a spring and the exterior surface of said key cylinder restrains said spring.

15. The modular door security system of claim 13, wherein said override device comprises a rigid, pivotable link which is biased toward said override position by a spring.

16. The modular door security system of claim 14, wherein said override position is defined by said spring exerting force against a moving wall, said moving wall urging an engagement pin into engagement with a hub rotatable by said exterior handle, whereby rotation of said exterior handle retracts said latch from said projected latched position.

17. The modular door security system of claim 15, wherein said override position is defined by said spring exerting force against said link, said link transmitting said force to a moving wall, said moving wall urging an engagement pin into engagement with a hub rotatable by said exterior handle, whereby rotation of said exterior handle retracts said latch from said projected latched position.

18. A modular door security system for controlling access through a door composing:

door means having spaced first and second surfaces, opposed upper and lower edges separated by a first distance, and opposed hinge and latch edges separated by a second distance, said second surface including a central portion comprising an area of said second surface at least ⅛ of said second distance from said hinge edge and said latch edge and at least ¼ of said first distance from said upper edge and said lower edge;

latch means for latching said door means, said latch means movable between a latched position and an unlatched position;

first operating means projecting from said first surface, said first operating means coupled with said latch means for movement of said latch means from said latched position to said unlatched position;

second operating means for movement of said latch means, said second operating means projecting from said second surface;

clutch means for selectively mechanically coupling said second operating means to said latch means;

input means for receiving an input, said input means located on said central portion of said second surface;

control means for comparing said input to a set of pre-established valid inputs and generating a clutch actuation signal upon detection of a valid input, said control means electrically connected to said clutch means and said input means, wherein said actuation signal causes said clutch means to mechanically couple said second operating means with said latch means, wherein said latch means, first operating means, second operating means and clutch means are incorporated into a lockset means, said lockset means including:

a key;

a key cylinder complementary to said key, said cylinder having an exterior surface and retractable lug projecting from said exterior surface, said lug retracting in response to insertion of said key; and an override device having an override position and a non-override position, said override position creating a mechanical coupling between said second operating means and said latch means, said override device being biased toward said override position;

said lockset having a receiver configured to receive said key cylinder and retain said cylinder when said lug is projecting from said exterior surface and release said cylinder when said lug is retracted;

wherein a received key cylinder impedes said override device from achieving said override position and removal of said key cylinders permits said override device to achieve said override position.

19. The modular system of claim 18, wherein said override device comprises a spring and said exterior surface of said key cylinder restrains said spring in the non-override position.

20. The modular system of claim 19, wherein said override position is defined by said spring exerting force against a moving wall, said moving wall urging an engagement pin into engagement with a hub rotatable by said second operating means, whereby rotation of said second operator means retracts said latch means from said latched position.

* * * * *